May 6, 1941.
J. B. BRIGHTMAN
2,241,053
REFRIGERATING MACHINE
Filed April 25, 1940
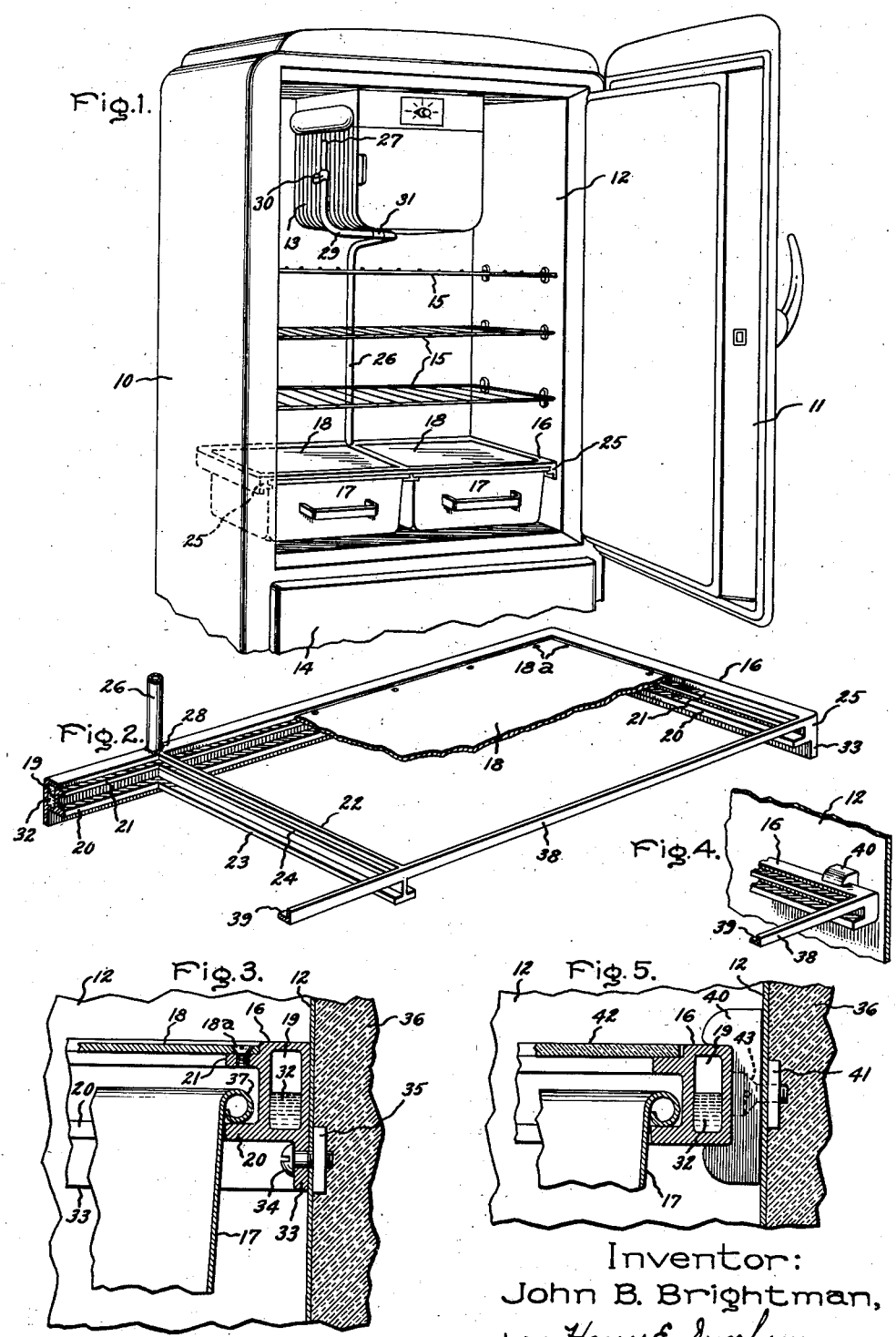
Inventor:
John B. Brightman,
by Harry E. Dunham
His Attorney.

Patented May 6, 1941

2,241,053

UNITED STATES PATENT OFFICE 2,241,053

REFRIGERATING MACHINE

John B. Brightman, Schenectady, N. Y., assignor to General Electric Company, a corporation of New York Application April 25, 1940, Serial No. 331,563

7 Claims. (Cl. 62—89)

My invention relates to refrigerating machines, and particularly to refrigerators of the household type.

Household refrigerators are commonly provided with thermally insulated cabinets having cooling units or evaporators in the upper portion thereof so that there is a naturally induced circulation of air throughout the food compartment. It is frequently desirable to provide vessels or pans which may be placed in the lower portion of the food compartment to contain foods such as vegetables which require high humidity. These pans are usually provided with covers for partially or completely enclosing them. When pans or other vessels of considerable size are placed in the lower portion of the cabinet, and particularly adjacent a bottom wall thereof, there is little, if any circulation of cold air around the lower portions of the pans, and since there is leakage of heat into the cabinet through the bottom wall particularly when the machinery compartment is arranged below the food compartment, it becomes difficult to maintain the desired low temperature of the foods in the pans.

Accordingly, it is an object of my invention to provide a refrigerating machine having a thermally insulated compartment with a cooling unit in the upper portion and a food containing pan in the lower portion and including an improved arrangement for maintaining the pan at relatively low temperatures.

Another object of my invention is to provide a refrigerating machine including a thermally insulated compartment cooled by a cooling unit in the upper portion thereof and having an improved arrangement for supporting a vegetable pan slidably in the lower portion of the compartment and for maintaining foods in the pan at desired low temperatures.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing, in which Fig. 1 is a perspective view of the upper portion of a household refrigerator embodying my invention; Fig. 2 is an enlarged perspective view of the vegetable pan supporting rack shown in Fig. 1; Fig. 3 is an enlarged sectional view of a portion of the supporting rack and vegetable pan shown in Fig. 1; Fig. 4 is a perspective view of a portion of a supporting rack similar to that shown in Fig. 2 showing a modified arrangement for mounting the rack in the cabinet; and Fig. 5 is an enlarged sectional view of the rack shown in Fig. 4.

The refrigerating machine illustrated comprises a thermally insulated cabinet providing a compartment cooled by an evaporator in the upper portion thereof and having a rack mounted in the lower portion of the cabinet for slidably supporting one or more vegetable pans near the bottom wall of the cabinet. A portion of the rack is made hollow and a conduit closed at its upper end communicates with the hollow portion of the rack and the rack and conduit together constitute a secondary refrigerating system, the hollow portion of the rack constituting the evaporator and the upper portion of the conduit being secured to the evaporator of the refrigerating machine and constituting the condenser for the secondary system. The rack and conduit may be constructed so that they can be removed readily from the refrigerator cabinet.

Referring now to the drawing, in Fig. 1, I have shown a household refrigerator having a cabinet 10 provided with a door 11 and having an inner liner 12 defining a food compartment. The food compartment is arranged to be cooled by an evaporator 13 mounted in the upper portion thereof and connected in the refrigerant circuit of a mechanical refrigerating machine, not shown. The refrigerating machine may be arranged in a compartment in the lower portion of the cabinet to which access may be had by removing a panel 14. The food compartment is provided with a plurality of grille-like shelves 15 and with a rack 16 in which are slidably supported two pans 17 for containing vegetables and similar foods. The tops of the pans are closed by plates 18 shown constructed of metal, but which may be of any other suitable material such as glass. The plates 18 may be secured to the rack 16 by screws 18a or may rest on the rack without being secured thereto. The pans 17 are supported from the racks 16 so that they are spaced from the side walls and from the bottom wall of the liner 12 of the food compartment.

Since the pans 17 and closure plates 18 greatly reduce the circulation of cold air around the bottom of the cabinet, there is a tendency for the bottom portion of the cabinet to be maintained at a considerably higher temperature than the remaining portion thereof and in order to maintain the necessary low temperatures in the pans 17, I construct the rack 16 so that it constitutes the evaporator of a secondary refrigerating system. As is clearly apparent from Figs. 1 and 2, the rack 16 comprises a main U-shaped hollow body portion, preferably constructed of extruded metal, such as aluminum bent in the form of a U and having an elongated chamber 19 formed therein and two ribs 20 and 21 on the inner side thereof and extending longitudinally around the rack. The upper rib 21 is provided to support the closure plates 18 and the lower rib 20 provides a guide for supporting the vegetable pans 17 slidably on the rack. A central guide member 22 is provided and has lower and upper ribs 23 and 24 constituting continuations of the ribs 20 and 21 respectively on the body portion of the rack. The ends of the passage 19 are closed as indicated at 25 so that a closed elongated chamber is provided within the rack. The front side of the rack may be provided with a cross bar 38 which is preferably of angle section providing a flange 39 cooperating with the ribs 21 and 24 to complete the support for the plates 18. In order to utilize the closed chamber 19 for cooling the rack, I provide a conduit 26 having its upper end closed at 27 and communicating with the passage 19 at its lower end, the conduit 26 being rigidly secured to the rack 16 at 28. The upper portion of the conduit 26 is bent to lie closely adjacent the evaporator 13 as indicated at 29, and is detachably secured to the evaporator by suitable clips 30 and 31 on the side and bottom, respectively, of the evaporator. The conduit 26 and hollow portion of the rack 16 constitute a secondary refrigerating system, the passage 19 being partially filled with a volatile liquid refrigerant as indicated at 32. The elongated chamber or passage 19 thus constitutes the evaporating portion of the secondary system and is in communication with the upper portion of the conduit 26 which constitutes the condensing portion of the secondary system. The rack 16 may be provided with a flange 33 extending downwardly from the body portion thereof and which may be secured to the liner 12 by machine screws 34 threaded in a suitable backer strap 35 on the inner side of the liner within the thermal insulation 36, as shown in Fig. 3. In this arrangement, the evaporation of liquid refrigerant 32 within the passage 19 cools the vegetable pan 17 which is supported on the rib 20 by a suitable roll or flange 37 and also cools a portion of the liner 12 above and below the rack 16. A space allowing circulation of air between the upper portion of the cabinet and the portion below the rack 16 is provided at the front of the rack between the door 11 and the vegetable pans.

In Figs. 4 and 5, I have shown an arrangement for supporting the rack within the cabinet which provides a more readily detachable construction and also allows a circulation of air between the rack and the liner 12 to further facilitate cooling of the pans 17. This construction is quite similar to that shown in Figs. 1, 2 and 3 and corresponding parts have been designated by the same numerals. The rack 16 is supported on suitable guides 40 which may be constructed of insulating material and are secured to the liner 12 by machine screws 43 engaging a suitable strap 41 similar to the strap 35 shown in Fig. 3. The rack 16, as shown in Figs. 4 and 5, is constructed without the depending flange 33 and is arranged to fit slidably in the supports 40. In this construction, there is ample circulation of air downwardly through the space between the liner 12 and the rack 16 and upwardly between the front of the pan 17 and the door 11 and with this arrangement, a glass plate 42 is preferably employed instead of the metal plate 18. When it is desired to remove the rack 16 from the refrigerator, it is merely necessary to take out the several shelves 15, remove the clips 30 and 31, and slide the rack out on the guides 40, thereby removing the entire secondary system from the cabinet. This arrangement is particularly advantageous for cleaning the food compartment.

During the operation of either of the embodiments illustrated, refrigerant within the hollow portion of the rack is vaporized by the absorption of heat from food within the lower portion of the cabinet, and particularly within the pans 17 which are in heat conducting relation with the rack. The vaporized refrigerant flows upwardly to the cold condensing portion of the conduit 26 in contact with the evaporator 13 where the vapor is cooled and condensed, the liquid refrigerant flowing back through the conduit 26 to the passage 19. Heat from the lower portion of the cabinet is thus transferred to the evaporator and removed from the compartment by operation of the refrigerating machine in the usual manner. The vegetable pans 17 may readily be slid out from their position on the guide flanges of the rack 16 so that vegetables or other foods may be taken out or placed therein.

While I have shown a particular form of my invention in connection with a household refrigerator, modifications will readily be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States, is:

1. A refrigerating machine including a thermally insulated cabinet having a compartment to be cooled, a cooling unit arranged in the upper portion of said compartment, a pan for containing foods to be cooled, a rack arranged within said compartment and having guides for supporting said pan slidably in the lower portion of said compartment, said rack having an elongated chamber therein, and means including a refrigerating system of the secondary type for cooling said rack, said secondary system including said elongated chamber as an evaporating section and having a condensing section secured in heat exchange relation with said cooling unit.

2. A refrigerating machine including a thermally insulated cabinet having a compartment to be cooled, a cooling unit arranged in the upper portion of said compartment, a pan for containing foods to be cooled, a hollow U-shaped rack arranged within said compartment and having guides for supporting said pan slidably in the lower portion of said compartment, and means including a refrigerating system of the secondary type having a condensing section secured in heat exchange relation with said cooling unit for cooling said pan, said hollow rack constituting the evaporating section of said secondary system.

3. A refrigerating machine including a thermally insulated cabinet having a compartment to be cooled, a cooling unit arranged in the upper portion of said compartment, a pan for containing foods to be cooled, a rack arranged within said compartment and having guides for supporting said pan slidably in the lower portion of said compartment, one portion of said rack having an elongated chamber therein, means for supporting said portion of said rack in spaced relation with the side wall of said compartment whereby air may circulate between said side wall and said rack, and means including a refrigerating system of the secondary type having a condensing section secured in heat exchange relation with said cooling unit for cooling said rack, the hollow portion of said rack constituting the evaporating section of said secondary system.

4. A refrigerating machine including a thermally insulated cabinet having a compartment to be cooled, a cooling unit arranged in the upper portion of said compartment, a pan for containing foods to be cooled, a hollow U-shaped rack arranged in said compartment below said cooling unit and comprising an extruded metal tube having a rib formed thereon longitudinally thereof, said tube being bent in the U-shaped form of said rack with said rib on the inner side of the U and constituting a guide for supporting said pan slidably in the lower portion of said compartment, and means including a refrigerating system of the secondary type having a condensing section secured in heat exchange relation with said cooling unit for cooling said pan, said extruded tube constituting the evaporating section of said secondary system.

5. A refrigerating machine including a thermally insulated cabinet having a compartment to be cooled, a cooling unit arranged in the upper portion of said compartment, a pan for containing foods to be cooled, a hollow U-shaped rack removably supported on the walls of said compartment, said rack comprising an extruded metal tube having a rib formed thereon longitudinally thereof, said tube being bent in the U-shaped form of said rack with said rib on the inner side of the U and constituting a guide for supporting said pan slidably on said rack, and means including a refrigerating system of the secondary type having a condensing section detachably secured to said cooling unit for cooling said pan, said extruded tube constituting the evaporating section of said secondary system.

6. A refrigerating machine including a thermally insulated cabinet having a compartment to be cooled, a cooling unit arranged in the upper portion of said compartment, a hollow U-shaped rack removably supported in said compartment below said cooling unit, said rack comprising an extruded metal tube bent in the form of a U and having two ribs formed on the inner side of the U longitudinally of said tube, a plate supported on the upper one of said ribs and constituting a shelf within said compartments, a pan for foods to be cooled supported on the lower one of said ribs, and a refrigerating system of the secondary type for cooling said pan, said system comprising a condensing portion detachably secured to said cooling unit and a conduit providing communication between said condensing portion and said extruded tube, said tube constituting the evaporating portion of said secondary system.

7. A refrigerating machine including a thermally insulated cabinet having a compartment to be cooled, a cooling unit arranged in the upper portion of said compartment, a pan for containing foods to be cooled, a hollow U-shaped rack supported in said compartment below said cooling unit and in spaced relation with the walls of said compartment whereby air may circulate between said rack and said walls, said rack comprising an extruded metal tube having a rib formed thereon longitudinally thereof, said tube being bent in the U-shaped form with said rib on the inner side of the U and constituting a guide for supporting said pan slidably in the lower portion of said compartment, a cover for said pan supported on said rack, said pan being removable from said rack independently of said cover, and means including a refrigerating system of the secondary type having a condensing section secured in heat exchange relation with said cooling unit for cooling said pan, said extruded tube constituting the evaporating section of said secondary system.

JOHN B. BRIGHTMAN.